(12) United States Patent
Hamstra (10) Patent No.: US 10,387,581 B2
(45) Date of Patent: Aug. 20, 2019

(54) SYSTEM FOR OPTIMIZATION OF BUILDING HEATING AND COOLING SYSTEMS

(71) Applicant: Greensleeves, LLC, Findlay, OH (US)

(72) Inventor: Stephen A. Hamstra, Zeeland, MI (US)

(73) Assignee: Greensleeves, LLC, Findlay, OH (US)

( * ) Notice: Subject to any disclaimer, the term of this patent is extended or adjusted under 35 U.S.C. 154(b) by 4 days.

(21) Appl. No.: 14/916,428

(22) PCT Filed: Sep. 5, 2014

(86) PCT No.: PCT/US2014/054402
§ 371 (c)(1),
(2) Date: Mar. 3, 2016

(87) PCT Pub. No.: WO2015/035241
PCT Pub. Date: Mar. 12, 2015

(65) Prior Publication Data
US 2016/0195288 A1 Jul. 7, 2016

Related U.S. Application Data

(60) Provisional application No. 61/874,297, filed on Sep. 5, 2013.

(51) Int. Cl.
*F24F 11/00* (2018.01)
*G06F 17/50* (2006.01)
(Continued)

(52) U.S. Cl.
CPC ............ *G06F 17/50* (2013.01); *F24F 11/30* (2018.01); *F24F 11/62* (2018.01); *F24F 11/70* (2018.01);
(Continued)

(58) Field of Classification Search
None
See application file for complete search history.

(56) References Cited

U.S. PATENT DOCUMENTS 2,154,263 A 4/1939 Carrier
3,729,051 A 4/1973 Mannion
(Continued)

FOREIGN PATENT DOCUMENTS

CN 2783217 Y 5/2006
CN 101004331 A 7/2007
(Continued)

OTHER PUBLICATIONS

Berke et al.; Application of artificial neural networks to the design optimization of aerospace structural components; NASA Tech. Memo; retrieved for the internet (https://ntrs.nasa.gov/archive/nasa/casi.ntrs.nasa.gov/19930012642.pdf); 12 pgs.; Mar. 1993.
(Continued)

*Primary Examiner* — Mohammad Ali
*Assistant Examiner* — Joshua T Sanders
(74) *Attorney, Agent, or Firm* — Shay Glenn LLP (57) ABSTRACT

A method of designing an optimized heating and cooling system includes: (1) automatically importing data from an energy model into an optimization model; (2) simulating energy use of a virtual heating and cooling system operating a thermal source or sink with the optimization model based upon the data from the energy model to obtain an optimized system design; (3) developing controls for an actual heating and cooling system based upon the optimized system design; and (4) automatically exporting the controls directly to a controller for the actual heating and cooling system.

6 Claims, 12 Drawing Sheets

(51) Int. Cl.
G05B 13/02 (2006.01)
G05B 17/02 (2006.01)
F24F 11/30 (2018.01)
F24F 11/62 (2018.01)
F24F 11/70 (2018.01)
F24F 11/89 (2018.01)

(52) U.S. Cl.
CPC ............ F24F 11/89 (2018.01); G05B 13/026 (2013.01); G05B 17/02 (2013.01)

(56) References Cited

U.S. PATENT DOCUMENTS

| | | | |
|---|---|---|---|
| 4,304,294 | A | 12/1981 | Reisman |
| 4,360,056 | A | 11/1982 | O'Connell |
| 4,375,806 | A | 3/1983 | Nishman |
| 4,909,312 | A | 3/1990 | Biedenbach et al. |
| 5,224,357 | A | 7/1993 | Galiyano et al. |
| 5,244,037 | A | 9/1993 | Warnke |
| 5,274,571 | A | 12/1993 | Hesse et al. |
| 5,323,843 | A | 6/1994 | Olszewski et al. |
| 5,467,265 | A | 11/1995 | Yamada et al. |
| 5,479,358 | A | 12/1995 | Shimoda et al. |
| 5,564,282 | A | 10/1996 | Kaye |
| 5,671,608 | A | 9/1997 | Wiggs et al. |
| 5,706,888 | A | 1/1998 | Ambs et al. |
| 5,778,683 | A | 7/1998 | Drees et al. |
| 5,934,369 | A | 8/1999 | Dosani et al. |
| 5,937,665 | A | 8/1999 | Kiessel et al. |
| 5,992,507 | A | 11/1999 | Peterson et al. |
| 6,250,371 | B1 | 6/2001 | Amerman et al. |
| 6,250,560 | B1 | 6/2001 | Kline et al. |
| 6,276,438 | B1 | 8/2001 | Amerman et al. |
| 6,959,520 | B2 | 11/2005 | Hartman |
| 7,228,696 | B2 | 6/2007 | Ambs et al. |
| 7,407,003 | B2 | 8/2008 | Ross |
| 7,647,773 | B1 | 1/2010 | Koenig |
| 7,894,943 | B2 | 2/2011 | Sloup et al. |
| 8,219,250 | B2 | 7/2012 | Dempster et al. |
| 8,291,720 | B2 | 10/2012 | Hartman |
| 8,346,398 | B2 | 1/2013 | Ahmed et al. |
| 8,378,280 | B2 | 2/2013 | Mills et al. |
| 8,571,832 | B2 | 10/2013 | Raman et al. |
| 8,851,066 | B1 | 10/2014 | Kapteyn |
| 9,080,789 | B2 | 7/2015 | Hamstra et al. |
| 9,360,236 | B2 | 6/2016 | Stewart et al. |
| 9,709,337 | B2 | 7/2017 | Pilebro et al. |
| 2004/0206085 | A1 | 10/2004 | Koenig et al. |
| 2004/0267408 | A1 | 12/2004 | Kramer |
| 2006/0048770 | A1 | 3/2006 | Meksvanh et al. |
| 2007/0017667 | A1 | 1/2007 | Weng |
| 2007/0179917 | A1 | 8/2007 | Patel et al. |
| 2007/0192078 | A1 | 8/2007 | Nasle et al. |
| 2007/0235179 | A1 | 10/2007 | Phillips |
| 2007/0295477 | A1 | 12/2007 | Mueller et al. |
| 2008/0230205 | A1 | 9/2008 | Seguin et al. |
| 2009/0019876 | A1 | 1/2009 | Guglietti et al. |
| 2009/0095477 | A1 | 4/2009 | Nguyen et al. |
| 2009/0194257 | A1 | 8/2009 | Niu et al. |
| 2009/0287355 | A1 | 11/2009 | Milder et al. |
| 2009/0307636 | A1 | 12/2009 | Cases et al. |
| 2010/0200191 | A1 | 8/2010 | Livingston |
| 2010/0223171 | A1 | 9/2010 | Baller |
| 2011/0125451 | A1 | 5/2011 | Cheifetz et al. |
| 2011/0153103 | A1* | 6/2011 | Brown ................... G06Q 10/04 700/291 |
| 2011/0220320 | A1* | 9/2011 | Kidwell ................. F24T 10/17 165/45 |
| 2012/0072181 | A1 | 3/2012 | Imani |
| 2012/0232701 | A1 | 9/2012 | Carty et al. |
| 2012/0271462 | A1 | 10/2012 | Dempster et al. |
| 2013/0013121 | A1 | 1/2013 | Henze et al. |
| 2013/0048114 | A1 | 2/2013 | Rothman et al. |
| 2013/0125565 | A1 | 5/2013 | Erpelding et al. |
| 2013/0179373 | A1 | 7/2013 | Mutchnik et al. |
| 2014/0133519 | A1 | 5/2014 | Freitag |
| 2015/0248511 | A1 | 9/2015 | Suryanarayana et al. |
| 2015/0316295 | A1 | 11/2015 | Hamstra et al. |
| 2016/0018125 | A1 | 1/2016 | Hamstra et al. |

FOREIGN PATENT DOCUMENTS

| | | |
|---|---|---|
| CN | 201066246 Y | 5/2008 |
| DE | 102008039105 A1 | 2/2010 |
| DE | 102012002028 A1 | 8/2013 |
| JP | S60-251336 A | 12/1985 |
| JP | 2000-212733 A | 8/2000 |
| JP | 2003-130494 A | 5/2003 |
| JP | 2003-214722 A | 7/2003 |
| JP | 2006-234376 A | 9/2006 |
| JP | 200890514 A | 4/2008 |
| JP | 2009-250454 A | 10/2009 |
| JP | 4948079 B2 | 6/2012 |
| WO | WO2009/007684 A1 | 1/2009 |
| WO | WO2009/042581 A1 | 4/2009 |

OTHER PUBLICATIONS

LeCroy et al.; Application of neural networks and stimulation modeling in manufacturing system design; SOUTHCON/96 (Conference); Orlando, FL, USA; pp. 322-326; Jun. 25-27, 1996.

Hackel, Scott P.; Development of Design Guidelines for Hybrid Ground-Coupled Heat Pump Systems; Master of Science thesis submitted at the University of Wisconsin—Madison; May 2008.

Kecebas et al.; Artificial neural network modeling of geothermal district system thought exergy analysis; Energy Conversion and Management; 64; pp. 206-212; Dec. 2012.

Hamstra et al., U.S. Appl. No. 16/247,446 entitled "Energy chassis and energy exchange device," filed Jan. 14, 2019.

\* cited by examiner

| Control temperature | Heating mode | | Cooling mode | |
|---|---|---|---|---|
| | GHX1 % | GHX2 % | GHX1 % | GHX2 % |
| < 56F | 100 | 100 | 0 | 0 |
| 56F <> 60F | 100 | 100 <> 30 | 0 | 0 |
| 60F <> 64F | 100 <> 30 | 0 | 0 | 0 |
| 64F <> 76F | 0 | 0 | 30 <> 100 | 0 |
| 80F <> 84F | 0 | 0 | 100 | 30 <> 100 |
| > 84F | 0 | 0 | 100 | 100 |

| Time (hrs) | GHX 1 | GHX 2 | GHX 3 | GHX 4 | GHX 5 |
|---|---|---|---|---|---|
| <4000 | On | On | On | On | Off |
| 4000 - 8000 | Off | On | On | On | On |
| 8000 - 12000 | On | Off | On | On | On |
| 12000 - 16000 | On | On | Off | On | On |
| 16000 - 20000 | On | On | On | Off | on |

| EER sum | Yr 1 | Yr 2 | Yr 3 | Yr 4 | Yr 5 | Avg EER | Total EER |
|---|---|---|---|---|---|---|---|
| Baseline | 160032.9 | 145332.9 | 129359.7 | 124157.2 | 123985.3 | 12.8 | 558882.7 |
| Rotating staging | 144997.2 | 143974.9 | 143894.4 | 143891.5 | 143891.4 | 16.4 | 720649 |

| EER sum | Yr 1 | Yr 2 | Yr 3 | Yr 4 | Yr 5 | Avg EER | Total EER |
|---|---|---|---|---|---|---|---|
| Baseline | 160032.9 | 145332.9 | 129359.7 | 124157.2 | 123985.3 | 12.8 | 558882.7 |
| 4000-hr Rotating staging | 144997.2 | 143974.9 | 143894.4 | 143891.5 | 143891.4 | 16.4 | 720649 |
| 1000-hr rotating staging | 155653.4 | 152753.7 | 151848.1 | 151334.8 | 151439.6 | 17.4 | 763027 |

FIG. 12

SYSTEM FOR OPTIMIZATION OF BUILDING HEATING AND COOLING SYSTEMS

CROSS REFERENCE TO RELATED APPLICATIONS

This application claims priority to U.S. Provisional Application No. 61/874,297, filed Sep. 5, 2013 and titled "SYSTEM FOR OPTIMIZATION OF BUILDING HEATING AND COOLING SYSTEMS," the entire contents of which are herein incorporated by reference.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Energy consumption in commercial and residential buildings is a very expensive component of the cost of operating and maintaining a building. For example, commercial buildings have expensive air conditioning and heating needs that, over the lifetime of the building(s), often add up to more than double the initial cost for construction. Attempts over the years to reduce energy consumption have resulted in adding substantial increases in construction costs that are often not recouped over the short term.

Buildings represent approximately 40% of the energy used in the United States and are fueled almost entirely with fossil fuels that are expensive and damaging to the environment. Further, there are a number of problems that make building heating, ventilation, and cooling (HVAC) systems inefficient. These problems include: (1) pressure to keep construction costs low by purchasing inexpensive, wasteful HVAC systems; (2) wasting potentially useful energy rejected through chillers, etc. rather than moving it to where it is needed or storing it for later use; (3) high energy movement through walls because of inadequate insulation; (4) constantly reheating and re-cooling the building mass rather than holding it at temperature; (5) overbuilt, inefficient systems that could be made much smaller; (6) the inability to effectively use local energy (e.g. solar, body heat, etc.); (7) heating the building when the heating system is least efficient and likewise cooling the building when the cooling system is least efficient; and (8) the expense of renewable energy sources. The need thus exists for an energy and cost-efficient heating and cooling system.

Further, According to the DoE report "Energy Efficient Buildings (EEB) HUB Intelligent Building Operations (Task 4) Overview" presented at the DOE BTO Sensors and Controls Program and Project Review, May 21, 2013, intelligent building energy operations have not been broadly used largely because of two major problems. First, it is expensive and time consuming to custom design every individual building and then design the control system for the building. Second, once the building and the intelligent control system are designed, there is a costly process for creating and programming the controls then commissioning them in the building. However, if intelligent building energy operations can be applied in a cost-effective and timely manner, market barriers to wide-spread adoption would be significantly reduced. Accordingly, a need exists for intelligent cost-efficient building energy operations.

SUMMARY

In general, in one embodiment, a method of designing an optimized heating and cooling system includes: (1) automatically importing data from an energy model into an optimization model; (2) simulating energy use of a virtual heating and cooling system operating a thermal source or sink with the optimization model based upon the data from the energy model to obtain an optimized system design; (3) developing controls for an actual heating and cooling system based upon the optimized system design; and (4) automatically exporting the controls directly to a controller for the actual heating and cooling system.

This and other embodiments can include one or more of the following features. The data from the energy model can include predicted thermal loads for the system design. The data from the energy model can include weather data for the system design. Simulating energy use to obtain an optimized system design can include calculating an amount of energy required to operate the system, determining a size of the system, or determining a cost of operating the system. Simulating the energy use can include using desired outcome parameters to determine the optimized system design. The desired outcome parameters can include lowest energy cost, lowest construction cost, or lowest life cycle cost.

In general, in one embodiment, a method of implementing an optimized heating and cooling system includes: (1) simulating energy use of a virtual heating and cooling system operating a thermal source or sink to obtain an optimized system design; (2) developing controls for an actual heating and cooling system based upon the optimized system design; (3) exporting the controls to a controller for the actual heating and cooling system; (4) operating the actual heating and cooling system; (5) tracking a thermal load on the system; (6) comparing the tracked thermal load to an expected thermal load; and (7) indicating a failure in the actual heating and cooling system if the tracked thermal load is a predetermined amount different than the expected thermal load.

This and other embodiments can include one or more of the following features. The predetermined amount can be a variance in the load of 25% or more. The method can further include obtaining the expected thermal load from an energy model. Indicating a failure can include sounding an alarm. The controls can include runtimes and start times for each of the thermal sources and sinks.

In general, in one embodiment, a method of implementing an optimized heating and cooling system includes: (1) simulating energy use of a virtual heating and cooling system operating a thermal source or sink to obtain an optimized system design; (2) developing controls for an actual heating and cooling system based upon the optimized system design; (3) exporting the controls to a controller for the actual heating and cooling system; (4) operating the actual heating and cooling system; (5) tracking a thermal load on the actual heating and cooling system for a set period of time; and (6) determining whether an additional energy saving strategy would reduce energy use of the actual heating and cooling system.

This and other embodiments can include one or more of the following features. The method can further include simulating energy use of the actual heating and cooling system under the controls prior to the determining step. The energy saving strategy can include separately controlling the pumping rates and times for a plurality of different heat sources or sinks individually. The energy saving strategy can include charging a building component in advance of projected energy needs. The energy saving strategy can include manipulating a temperature difference between a source of thermal energy and a user of energy.

In general, in one embodiment, a method for determining an optimal use of a plurality of geothermal heat exchangers includes: (1) activating a plurality of geothermal heat exchangers under a first set of controls; (2) predicting a thermal loss or gain for each of the plurality of geothermal heat exchangers over a selected period of time under the first set of controls; and (3) activating the plurality of geothermal heat exchangers under a second set of controls based upon the predicted thermal loss or gain such that the runtime and/or flow rate varies from one geothermal heat exchanger to another.

This and other embodiments can include one or more of the following features. The method can further include determining the runtime and/or flow rate for each of the geothermal heat exchangers in the second set of controls by optimizing the runtimes and flow rates. Optimizing the runtime and flow rates can include using particle swarm optimization. Activating the plurality of geothermal heat exchangers under the second set of controls can include running all of the geothermal heat exchangers at a minimum flow rate and then ramping each geothermal heat exchanger to a higher flow rate. The method can further include staggering a start-time for ramping each of the geothermal heat exchangers.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Described herein is an optimized heating and cooling system (or heating, ventilation, and air-conditioning (HVAC)) system that includes thermal sources and/or thermal sinks and a method for optimization of such a system. The system and method described herein advantageously reduces the amount of energy required to heat and cool a building and the size of the equipment required to do so. The system and method described herein also advantageously produces automated intelligent building controls specifically for an individual building design in order to optimize the performance of the HVAC system, eliminating substantial cost and errors in the process.

The methods described herein can be used with any suitable energy management systems including geothermal HVAC, hybrid geothermal HVAC, hybrid HVAC systems, high efficiency HVAC systems, and HVAC systems that include a thermal storage capability even though aspects of the disclosure are described with specific reference to geothermal or ground-source heat pump HVAC systems. The methods described herein can be used with any of the energy systems described in U.S. Patent Application Publication No. 2011/0272117, titled "Energy Chassis and Energy Exchange Device," and filed May 5, 2011, and/or in conjunction with the methods described in International Patent Application No. PCT/US2014/020379, filed Mar. 4, 2014 and titled "Energy Management Systems and Methods of Use," both of which are incorporated by reference herein.

Figure 1:
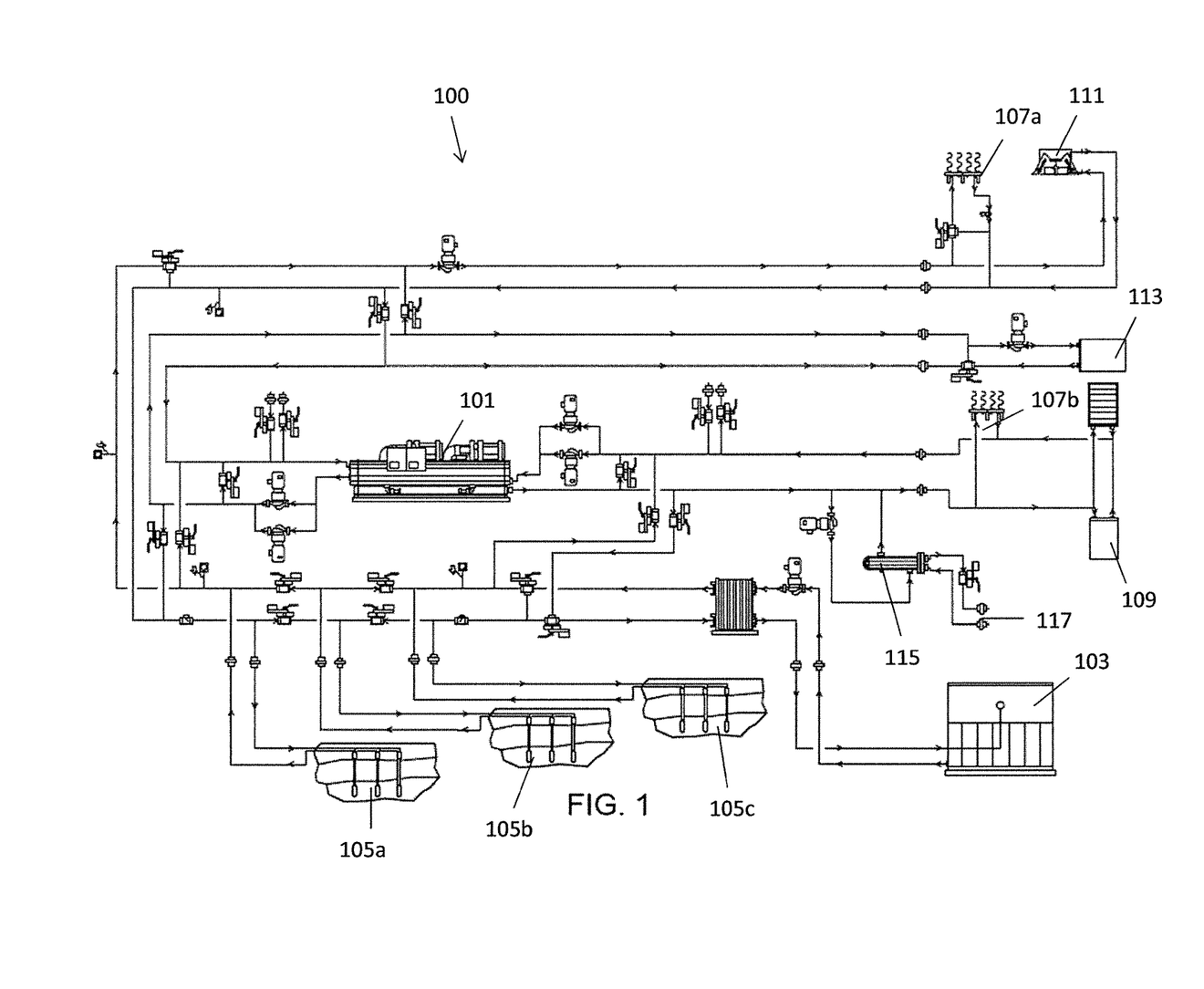
FIG. 1 shows elements of an exemplary geothermal HVAC system.

An exemplary heating and cooling system 100 is shown in FIG. 1. The system 100 includes a chiller 101, a cooling tower 103, and three geothermal earth heat exchangers 105a,b,c. The chiller 101, cooling tower 103, and geothermal earth heat exchangers 105a,b,c can be used to control the heating and cooling system of a building, such as provide hot water for radiant floor panels 107a,b and heating coils 109 and provide chilled water for cooling of the floor panels 107a,b, the chilled beams 111, and the cooling coils 113. The chiller 101 can be a 65 ton magnetic bearing chiller. The cooling tower 103 can be a 90 ton closed-circuit cooling tower with a nominal flow rate of 90 GPM. Further, the geothermal earth heat exchangers can have flow rates of nominally 90 GPM each, and each can be on a separate fluid line and separately controllable, as described further below. In some embodiments, a plate and frame heat exchanger 121 can be used to allow heat transfer between two streams of fluid without the streams contacting one another. In some embodiments, the system can include a back-up heat source 115, such as a shell and tube heat exchanger, that can allow heat transfer without the fluid streams mixing together and can be configured to turn on only in an emergency, such as if the chiller 101 fails. Likewise, in some embodiments, the system 100 can include a connection 117 to a back-up hot water system for emergencies. In some embodiments, selection of the source of chilled or heated water can be automatically determined by the needed fluid temperature, the availability from the various sources, and the real-time energy consumption and cost. Various check valves and pressure sensors can be used to control the flow of fluid throughout the system.

Figure 2:
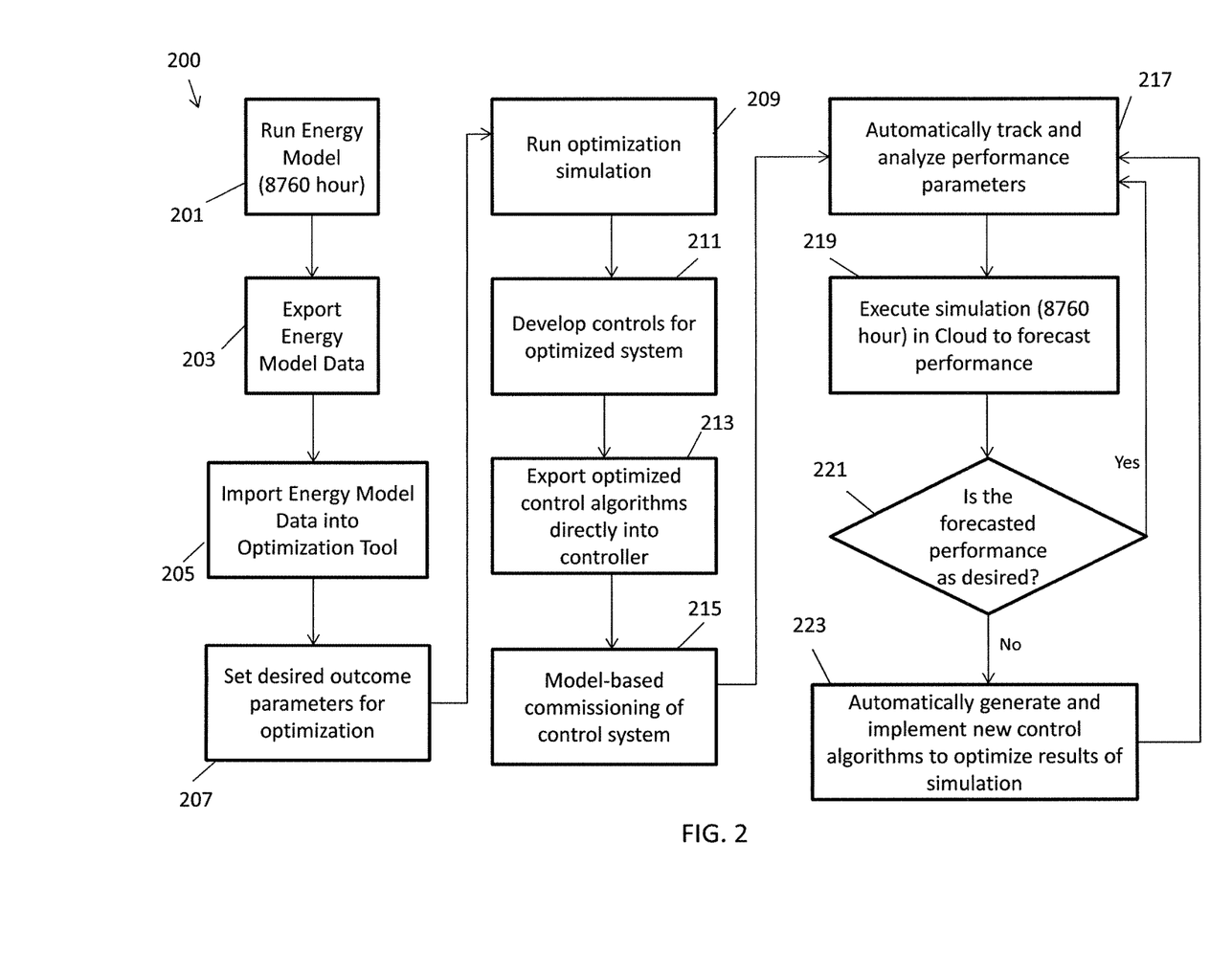
FIG. 2 is a flow chart showing a method of optimizing an HVAC system.

In one embodiment, a heating and cooling system, such as the system shown in FIG. 1, can be designed and operated through an optimization platform. Referring to FIG. 2, a method of optimization 200 can include, at step 201, first running an energy model, such as with an engineers' HVAC system design software, e.g., Trane TRACE 700, Energy-Plus, or DOE 2, to simulate operation of the building HVAC system for one year (8760 hours) to determine the heating and cooling loads required for the building over the course of the year (due to weather, heating, cooling, lighting, ventilation, water use, etc. of the building). Information regarding these loads can then be exported from the energy model (at step 203) and imported (at step 205) into a computerized optimization engine that will apply a series of efficiency enhancing operating strategies to the system in a computerized simulation of the reduced energy use of the optimized system. At step 207, the desired outcome parameters for optimization can be set by the user (such as lowest cost, lowest energy use, smallest size, lowest construction cost, or lowest life cycle cost). At step 209, the simulation can be run to calculate the energy required to operate the optimized system, the size of the system components required to meet the peak load requirements, and the cost of operating the system. The output of the optimization engine at this step is the sizing of the equipment, based on the desired goal of either lowest energy cost, lowest first (construction) cost, or lowest life cycle cost. Advantageously, steps 201 through 209 can be performed automatically, even from the energy model to the optimization tool, to converge on the optimum solution without input from the engineer and/or requiring the engineer to perform iterative simulations in an attempt to reach an optimum case.

Referring still to FIG. 2, at step 211, custom intelligent controls for the optimized system (e.g., when to use various heat sources, how to heat and cool without using the chiller, etc.) can then be developed. At step 213, these optimized control algorithms can be automatically exported to a controller of the system (e.g., once the system is constructed). This process advantageously adds the capability of optimization and reduces or eliminates human interaction with the information required to create intelligent building controls for a specific building design, thereby reducing time for code writing, debugging and controls commissioning.

At step 215, the system can be tested and implemented using the controls developed at step 211. That is, the thermal load can be tracked immediately (such as by measuring the water flow at a geothermal heat exchanger and the temperature difference across it). If there is a difference in the thermal load relative to expected based upon the energy model (from steps 201 and 203), the system can flag an error and/or sound an alarm. A large difference, such as a consistent variance of 25% or more, can be used to indicate equipment failure or other problem with the system. Thus, for the initial system commissioning process, this "model-based" performance information provides a metric for comparison to actual thermal loads and equipment performance, reducing the commissioning time and identifying system issues very rapidly. When applied, this technology can identify, during the start-up and commissioning phase of a building, if the heating/cooling loads are significantly different from the anticipated loads identified in the energy model during the design process, allowing identification and corrective action to be taken immediately instead of in the future when high energy consumption indicates a potential problem. This comparison of design data versus actual performance data allows precise reporting of the actual heating and cooling energy load, the cost of meeting that load, and the availability of alternative sources of supply for meeting that load when applied to a limited thermal source or sink, such as a ground-source deep earth heat exchanger. This allows performance feedback reporting that measures the building's actual performance against the original design. In some embodiments, the optimized intelligent control software stores the original HVAC system design and energy model for the design so that the actual performance of the system can be compared to the energy projections made at the time the system was designed.

Further, once the system is implemented, performance parameters can be automatically tracked at step 217. Based upon those parameters, a simulation can be executed at step 219 (such as an 8760 simulation) to forecast future performance based upon the tracked parameters. If the determined future performance indicates an undesireable outcome at step 221 (such as an energy use that is too high, a lifecycle cost that is too high), then new optimized control algorithms can be developed and implemented at step 223. The tracking, simulation, and generating steps (217, 219, 221, 223) can then be repeated, such as every 5-7 days.

In some embodiments, the environmental, occupancy, and other factors used in the original energy model can be updated to provide a performance baseline for the comparison of actual versus predicted performance to provide system and energy performance feedback to the building owner/operator. The system can process information from the HVAC control system sensors typically applied in order to determine actual thermal energy flows to calculate the performance metrics.

Figure 3:
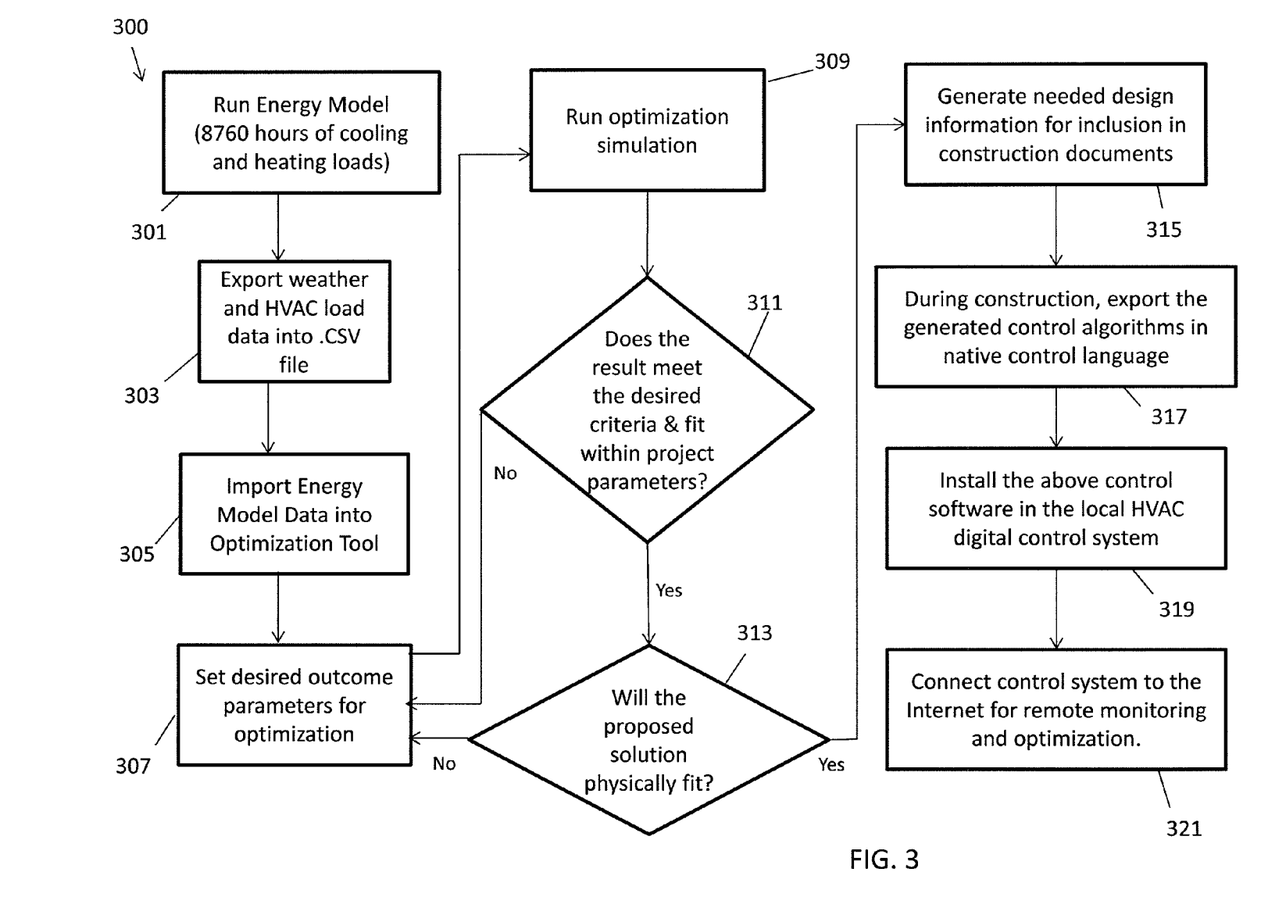
FIG. 3 is a flow chart showing a method of developing optimized controls for an HVAC system.

A more detailed method 300 of developing the controls for an HVAC system is shown in FIG. 3. At step 301, the energy model is run. Weather and HVAC load data are exported at step 303, such as into a .CSV file. The data can then be loaded into the optimization tool at step 305, the desired outcome parameters can be set at step 307, and the optimization simulation can be run at step 309 (similar to steps 201-209 of FIG. 2). At step 311, it can be determined whether the results meet the desired criteria and fit within project parameters and, at step 313, it can be determined with the proposed solution will fit in the allotted space. Following the development of the design, construction documents can be prepared at step 315, control algorithms can be exported at step 317 and installed onto the HVAC system controller at step 319, and then the control system can be set up for tracking and monitoring at step 319 (such as be connected to the Internet for remote monitoring and optimization).

Thus, once the design profile is captured, the appropriate HVAC system components can be sized and configured using virtual models (computer code) of their performance to simulate the optimum operation of that equipment. The HVAC system equipment performance can be defined using a series of mathematical expressions that take into account typical operating parameters, loading, etc. From the sizing, the engineer can prepare the specifications for construction. Typically, mechanical engineers configure the HVAC system design and then use an energy model to simulate operation of the system using occupancy and use assumptions from the owner with typical weather data for the location to simulate operation of the building for a year. The peak heating and cooling loads of the system tell the engineer how large the heating and cooling components have to be. The system and process described with respect to method 300 can still include running the design in a simulation for a year, but the optimization software can be used to operate the system. In this simulation, the optimization engine reduces the use of energy, which lowers the peak equipment loads, which in turn may reduce the size of equipment or system components, such as geothermal deep earth heat exchangers and cooling towers. This advantageously creates a smaller system that both costs less to buy and reduces the energy used by the system.

A functional example of the use of the method 300 is the application of a ground-source heat pump HVAC system for a new building. One approach is to install a ground heat exchanger (GHX) that is sufficiently large to provide all heating and cooling for the facility. However, if the annual cooling load requirements are much greater than the annual heating load requirements, the GHX will need to be sized for the cooling load and will have excess capacity during the heating season. This may create a high first cost penalty, which might eliminate the consideration of a ground-source heat pump system. In lieu of this approach, if the above intelligent design optimization software is used and combined with intelligent controls to pre-condition a smaller (and less expensive) GHX using a closed-circuit cooling tower operating in the winter (heating) season, the first (construction) cost will be much lower (potentially 50 to 70%), and the energy consumption may also be lower due to more optimum entering water temperatures provided to the heat pumps.

Advantageously, the method descried with respect to FIGS. 2 and 3 can be used to link the development of the controls for the HVAC system directly to the mechanical engineers design model (virtual building energy model prepared using industry-standard energy modeling software) in order to eliminate steps, errors and costs in the process of optimizing the design and operation of the HVAC system towards a specific design performance parameter, such as lowest energy cost or lowest life cycle cost. Furthermore, the optimization engine can then configure the optimized control software for the specific building in lieu of the traditional written sequence of operation that must be manually converted to the appropriate machine language. Once the control optimization software is configured, it can be loaded into the building control system. This creates a seamless, automated process from the system design by the MEP engineer thru the optimization, sizing, control system configuration and ultimately thru the installation. This seamless process reduces the cost, errors and risks of the system, making intelligent building operations systems much more affordable, easier to design and install.

Figure 4:
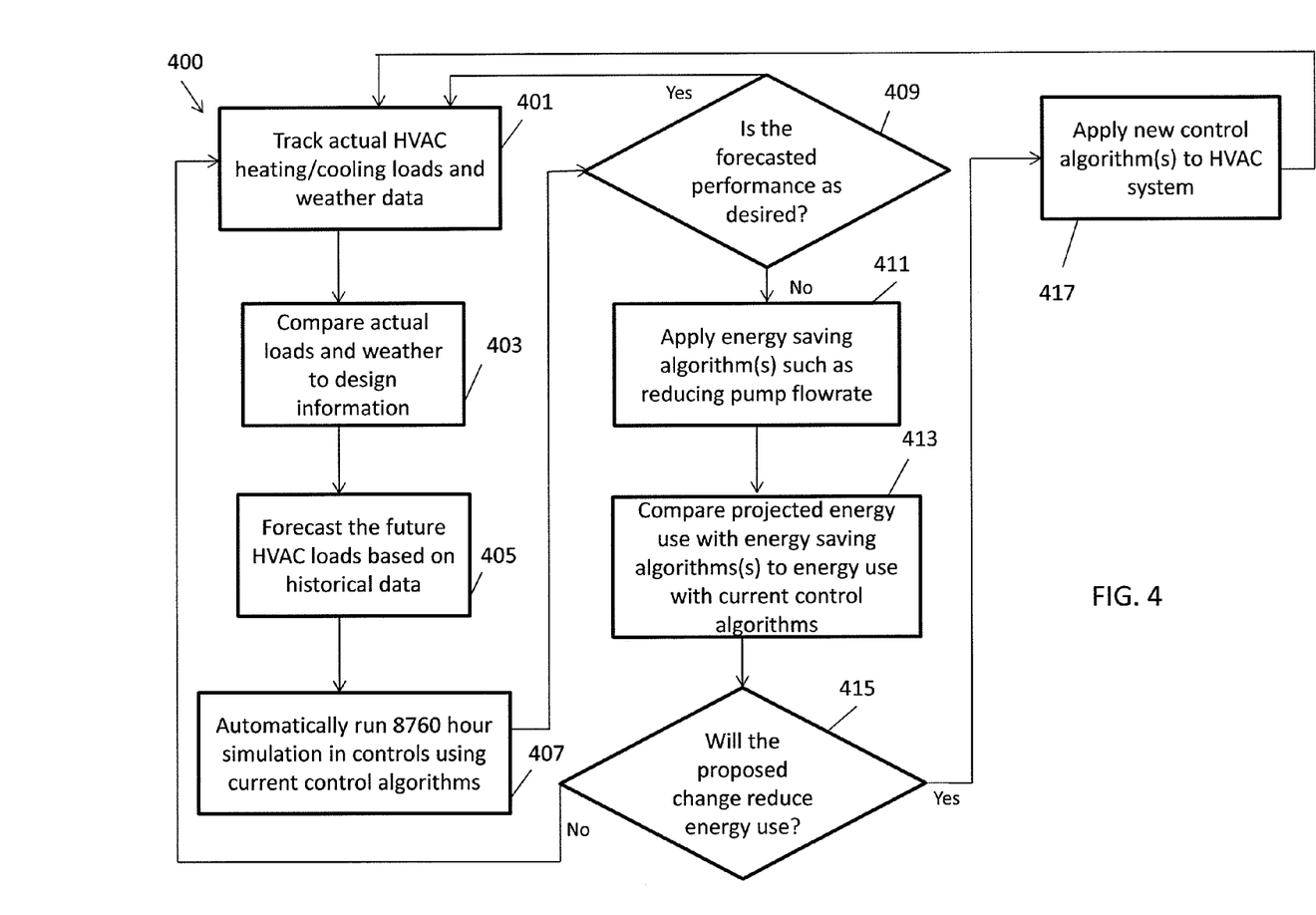
FIG. 4 is a flow chart showing a method of implementing energy saving strategies to optimize an HVAC system after installation.

Referring to FIG. 4, a more detailed method 400 for implementing energy saving strategies to further optimize an HVAC system after construction and implementation of initial controls is shown. That is, at step 401, the actual HVAC heating and cooling loads and weather can be tracked. At step 403, the actual loads and weather can be compared to design information at step 405, future HVAC loads can be predicted, and a simulation can be run using current control algorithms at step 407 (similar to steps 217 and 219 of method 200). At step 409, it can be determined whether the forecasted performance from the simulation is as desired. If not, one or more energy saving algorithms can be applied at step 411. At step 413, the projected energy use with the energy saving algorithm(s) can be compared to the energy use with the current control algorithms. Further, at step 415, it can be determined whether the proposed change will reduce energy use. If so, then the algorithms can be implemented at step 417. The process can be repeated every 5 to 7 days.

Referring to step 411, various energy saving strategies can be used to potentially improve the efficiency of the building HVAC system after the initial controls have been implemented. These energy saving strategies can be used individually, but also in synergistic groups that make the performance of each piece of equipment more efficient and make the performance of the entire network of energy devices, including waste energy recycling and the capture of environmental energy, operate more efficient as a total system. This process continuously adapts key control algorithms to account for changing building HVAC load profiles, changing utility rate structures, changing weather, etc. In performing monitoring-based system optimization, various energy saving strategies can be implemented as algorithms in software designed to be expanded with new strategies over time.

One exemplary energy savings strategy includes determining the optimum pumping (flow) rate for a given piece of equipment in a HVAC system in order to determine how long and at what rate to operate one or more different pumps in order to minimize the amount of energy used by the entire system. For example, changing the runtime and/or flow of a plurality of different ground heat exchangers (GHX) can advantageously decrease the overall power consumption of the system.

Figure 5:
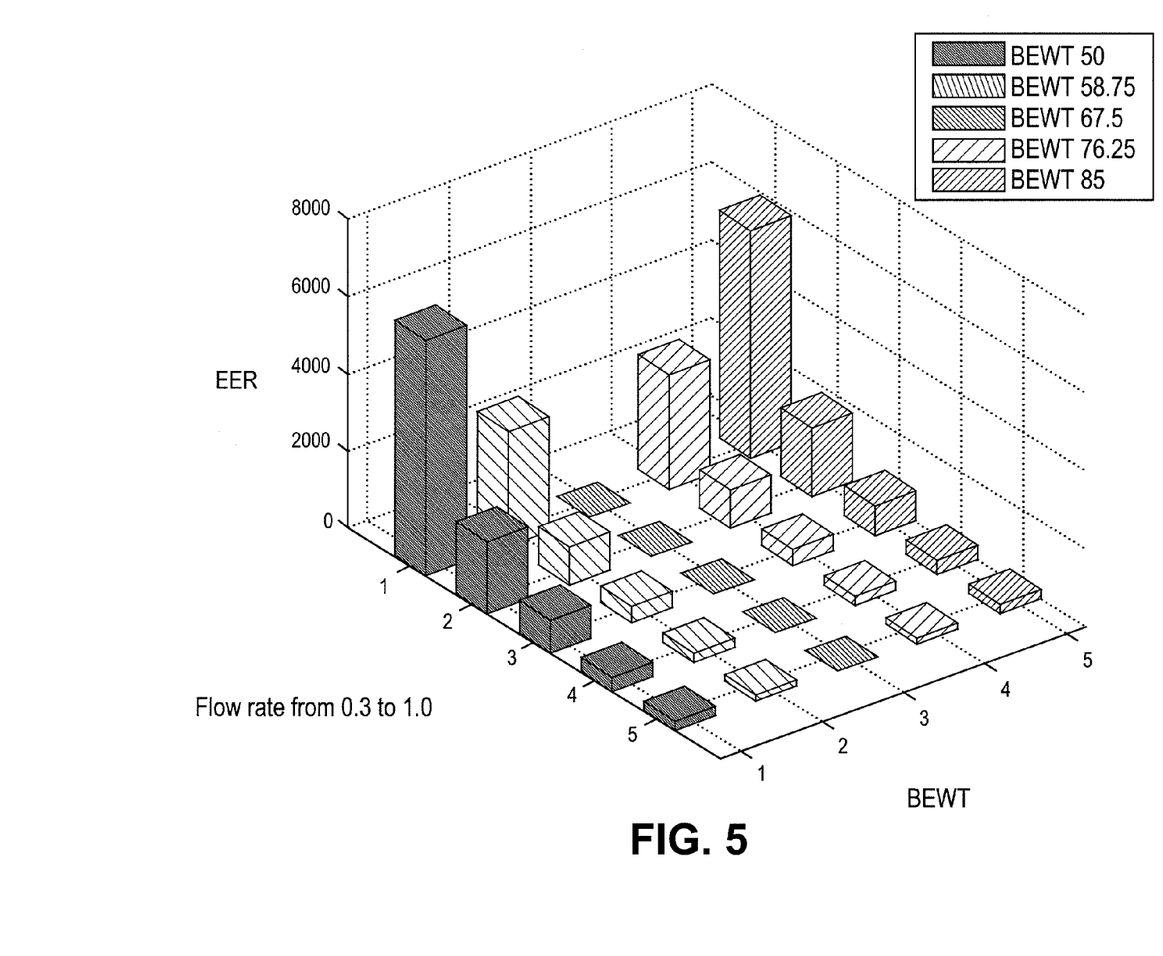
FIG. 5 is a graph showing the energy efficiency ratio of various geothermal heat exchangers at different flow rates and water inlet temperatures.

In one exemplary study of a system that included five ground heat exchangers, in order to quantify the optimal efficiency of the GHX, the efficiency metric used (EER, or energy efficiency ratio) was defined for the GHX as the ratio of the total heat absorbed or rejected by the GHX to the power consumed by the GHX pump (nominally BTU/W-hr). Then each GHX model was run through a series of cases of varying water inlet temperature and flow rate. The results are shown in FIG. 5. For cases of entering water temperature greater than 67.5 F, the GHX was absorbing heat from the water, while in all cases below 67.5 F, the GHX was rejecting heat to the water. In each operating regime, the maximum EER occurred at the minimum pump flow rate.

Figure 6:
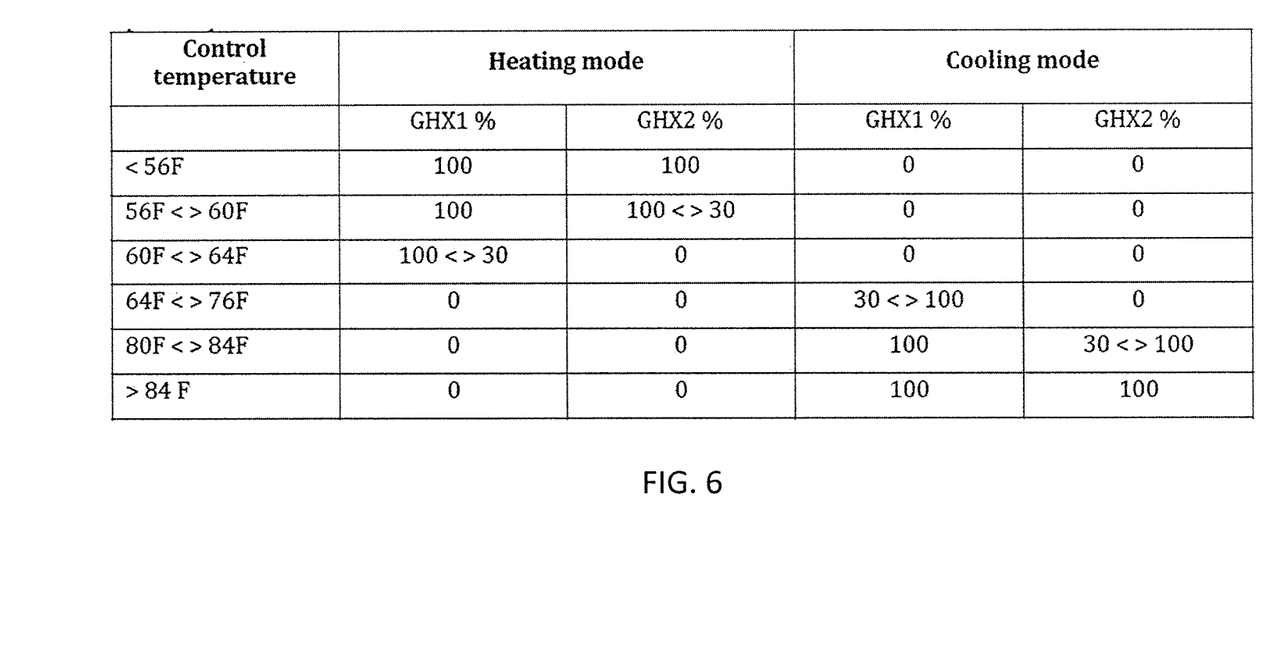
FIG. 6 is a table showing pump staging control for five different geothermal heat exchangers.

As a result of the EER study, it was determined that in the interest of preserving minimum pump speed, and thus minimum power consumption and maximum GHX EER, a GHX staging control was desired such that at stage 1, increasing building entering water temperature would command successive GHX pumps to start at minimum flow. If building entering water temperature continued to increase (assuming the fluid loop was rejecting heat to the ground), and once all GHX pumps were running at minimum flow, each GHX pump would then be allow to speed up in sequence until such time as all GHX pumps were running at full flow (speed). The baseline model was again run through an annual, hourly simulation using pump staging control as shown in FIG. 6. Assuming a constant pump efficiency, the total annual GHX power consumption with staging control was 30% less than the baseline power consumption.

In order to model the use of various runtimes for pumps to determine how to control the pumps (and to determine whether any energy savings would result from doing so), various modeling techniques, such as genetic algorithm optimization or particle swarm optimization, can be used. In one embodiment, particle swarm optimization is used.

Particle swarm optimization considers a random set of "particles," each of which is a possible solution to the optimization problem (objective function), and are allowed to "fly" or move as a swarm through the solution space. In a two-variable optimization function, the solution space would be two dimensions, with each dimension corresponding to an objective function variable. A random set of particles defines the first swarm. These particles are each given a position in the solution space as well as a velocity vector. Each particle thus knows where it is and where it is going. Each particle is evaluated for its fitness to the solution, and then using this knowledge, successive new generations of particles are produced. Each particle is evaluated for both its personal best fit and its global fit. Each particle, at each generation (or position in the solution space), is evaluated to determine if it is a better fit than it was any other prior position. If not, it is left behind in the swarm. If it is better, then its fitness is compared to the rest of the swarm. If its own fitness is better than any other particle in the swarm (a global best), it is allowed to continue to the next generation. If not, it is moving away from the optimal swarm in the solution space, and so it is left behind in the swarm and not allowed to continue to the next generation. Each new population is therefore moving closer to the optimal solution in the solution space. Once the value of the global best solution remains steady from generation to generation, the global optimum has been reached.

Figure 7:
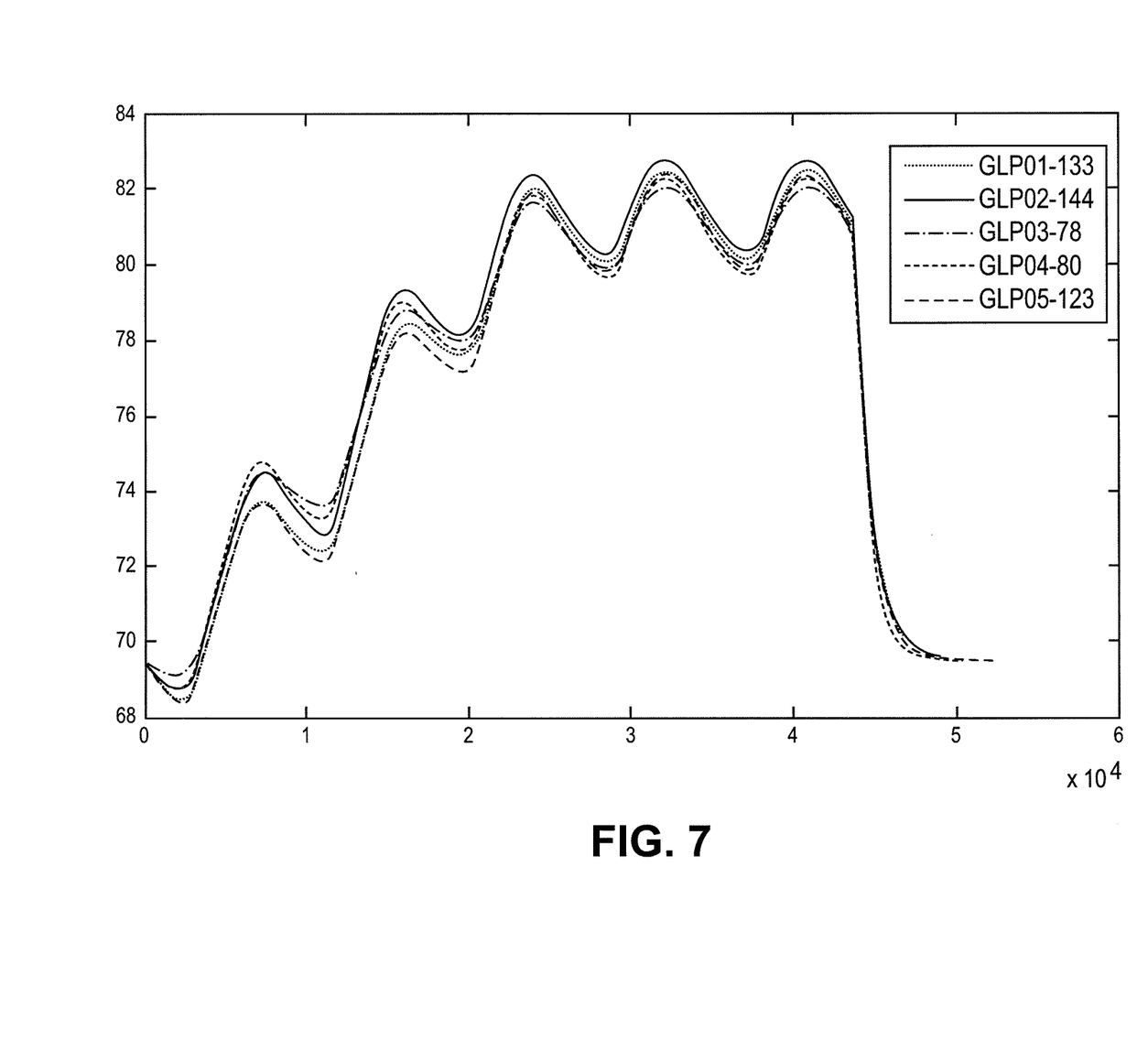
FIG. 7 is a graph showing the temperature decay in a five year simulation of the use of five different geothermal heat exchangers.

An individual GHX can be cooled by allowing it to "rest" and dissipate its heat to the surrounding soil. Assuming that this temperature decay is exponential, the fully integrated system model (ISM) was run through a five-year simulation, and then all five borefields were "turned off" so that their decay might be predicted as shown in FIG. 7. During a full load run, the individual GHX temperatures approached a maximum of approximately 82° F., and stabilized around a nominal 81° F. Each GHX then recovered during rest to the initial temperature over the next 5000 hours.

Figure 8:
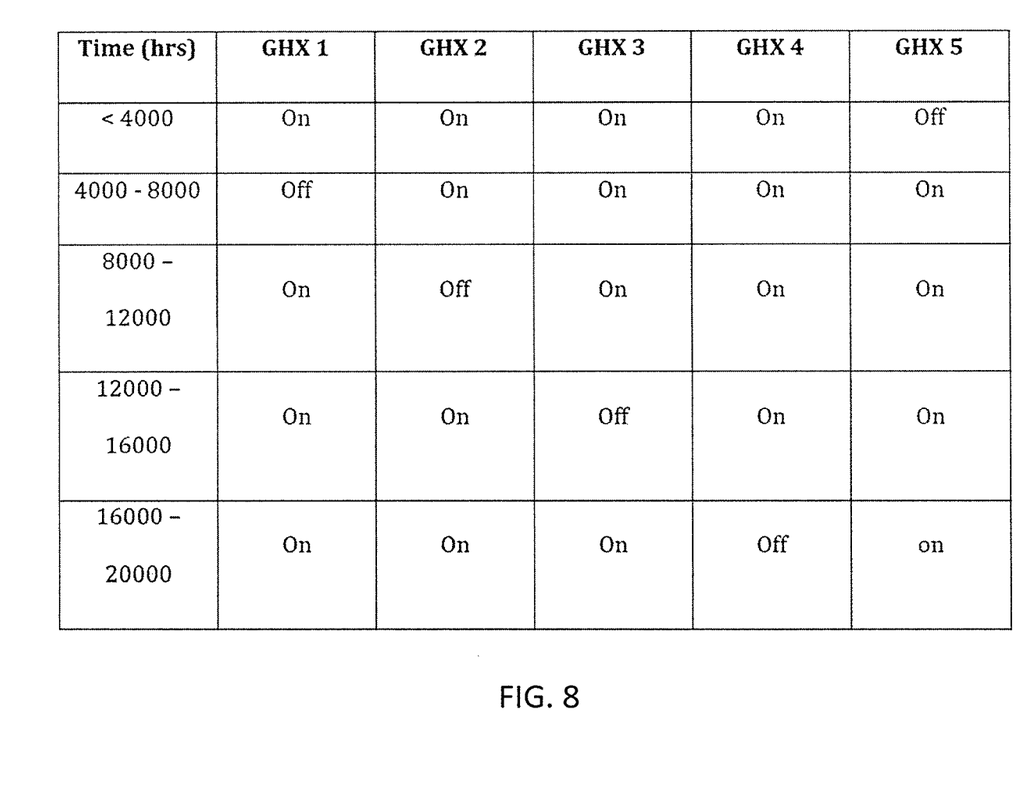
FIG. 8 is a table showing rotation of on and off times for five different geothermal heat exchangers.

Knowing that the GHX can recover on its own under zero flow conditions, each GHX can be "rested" while the others provide the heat sink for the loop. For the next run, each GHX was allowed to rest for 4000 hours in sequence over a five-year simulation as shown in FIG. 8.

Figure 9:
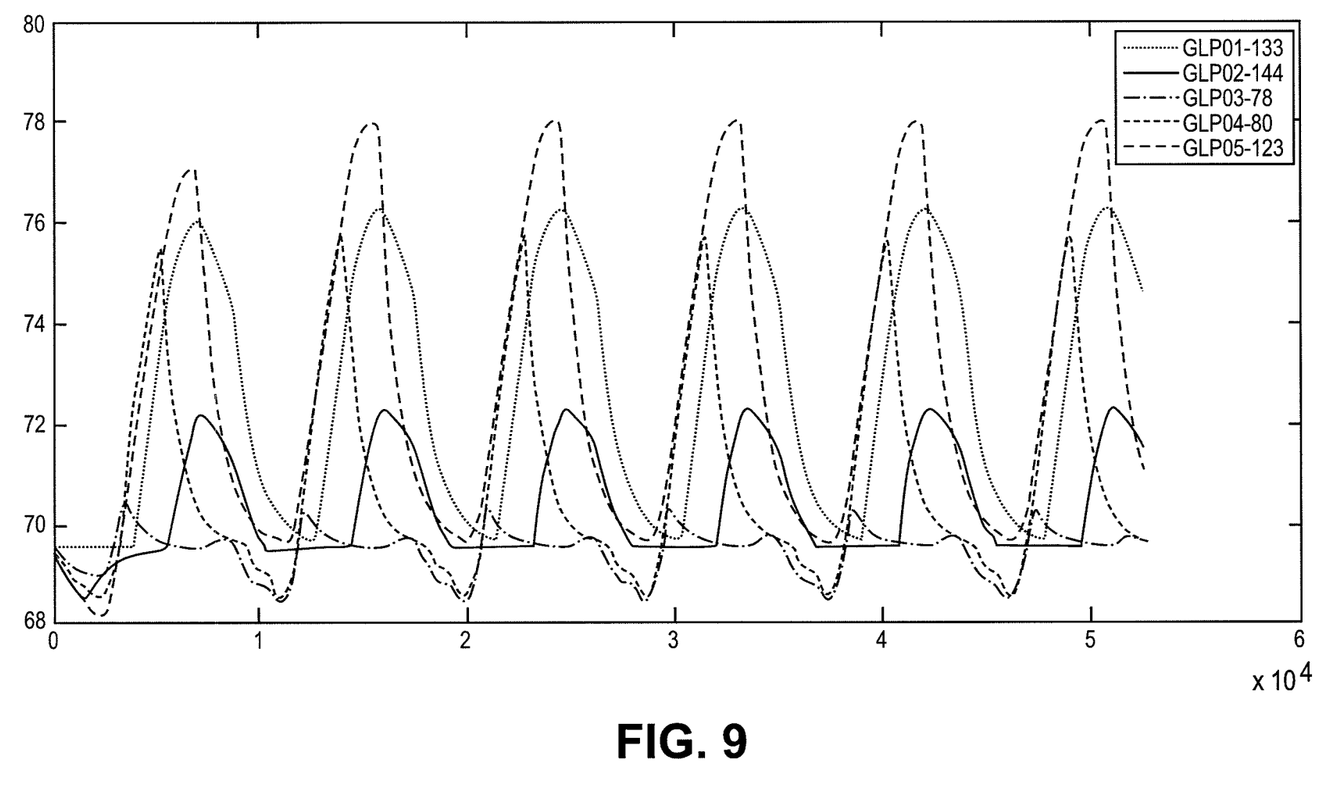
FIG. 9 is a graph showing the temperatures in five different geothermal heat exchangers when shut on and off as shown in FIG. 8.
Figure 10:
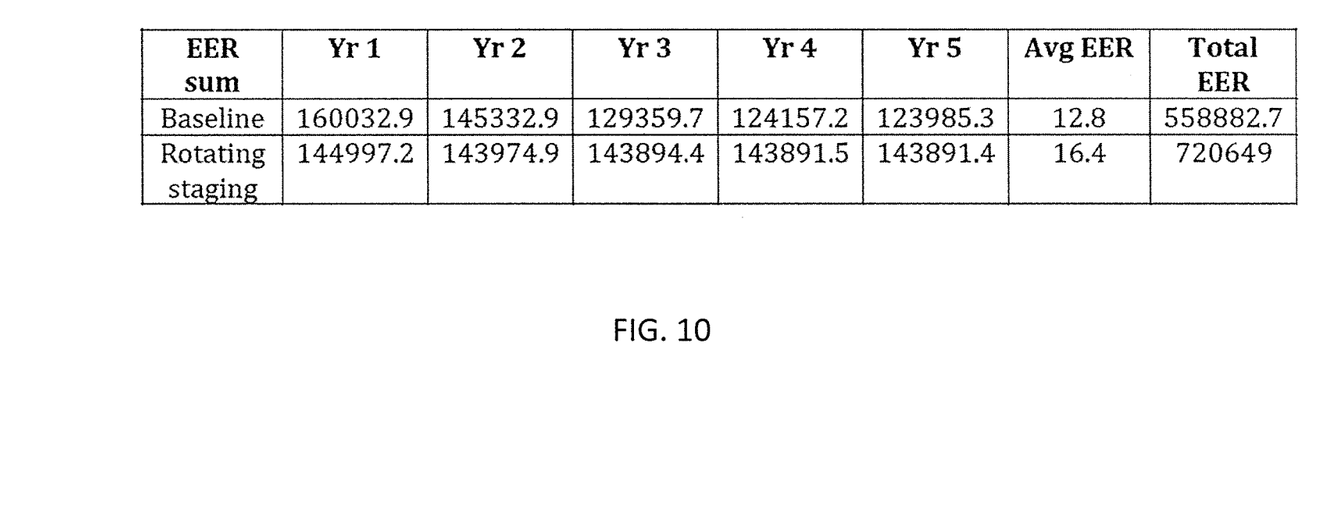
FIG. 10 is a table showing the energy efficiency ratio across 5 years when rotating the geothermal heat exchangers on and off as in FIG. 8.

In this study, each GHX was either "on" or "off" (no variable flow), and in the interest of preserving GHX EER, each GHX that was "on" was randomly limited to 70% of maximum flow. The associated GHX temperatures are shown in FIG. 9. To summarize plant power consumption, the total EER was summed for each year and is summarized in FIG. 10. The baseline case shown in FIG. 10 was produced with all GHXs running at full load. The year one sum of 160,032 corresponds to an average hourly EER of 18.2. However, as the GHX temperatures rise, the EERs drop to an hourly average of approximately 14.1 at the end of year 5. The rotating staging case shows relatively constant plant EER over the five year span with the staging and GHX recovery control producing both a higher total and higher average EER.

Figure 11:
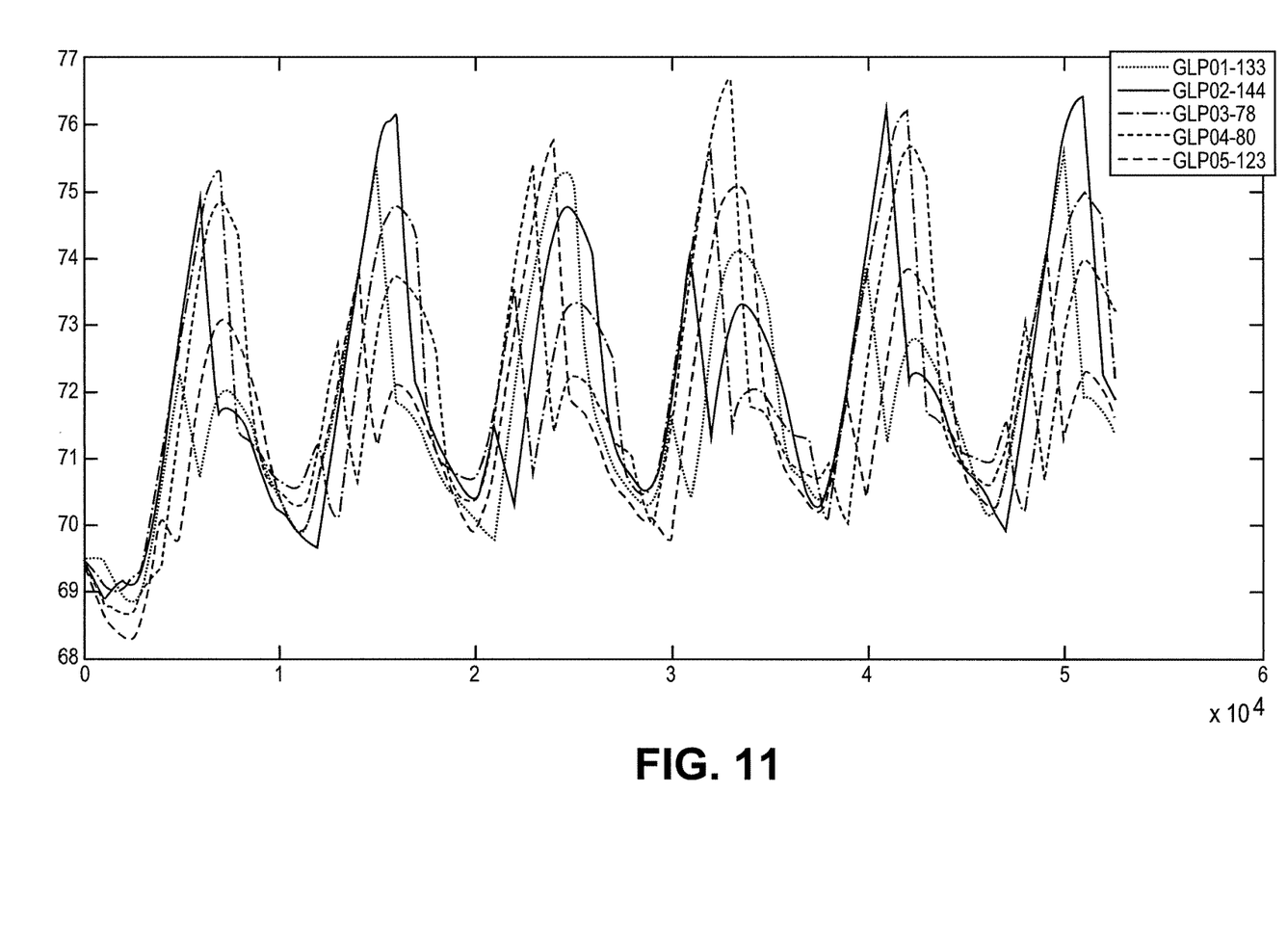
FIG. 11 is a graph showing soil temperatures when flow through five geothermal heat exchangers is rotated.
Figure 12:
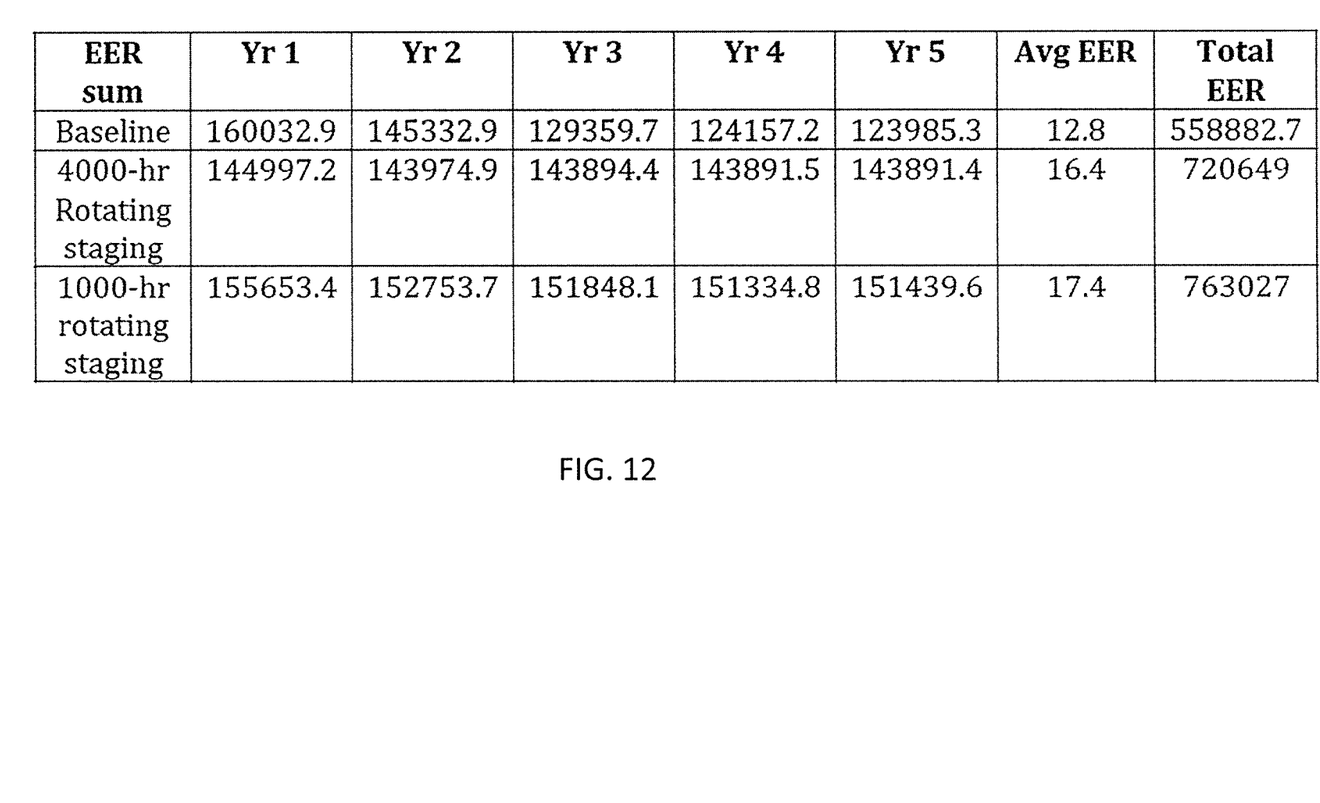
FIG. 12 is a table showing the energy efficiency ratio across 5 years when rotating geothermal heat exchangers on and off.

The next study was using a sequential rotating schedule for the five GHXs, but the rotation occurred every 1000 hours instead of 4000. It was deduced then that the individual GHXs would not fully recover after only resting for 1000 hours, but it was assumed that they would reach steady-state, so the question was at what soil temperature would they reach steady-state and at what EER penalty would that occur. The resulting soil temperatures are as shown in FIG. 11. The overall temperature rise was on the order of 3° F. as compared to the more balanced result that occurred with the 4000-hour rest period. This was as was expected since the GHXs were not allowed to fully recover. The EERs are summarized in FIG. 12. From FIG. 12, it can be seen that the plant EER may be increased (and thus plant power consumption decreased) by allowing individual GHXs to rest at defined rotation intervals, and that it may be further increased by rotating the GHXs at shorter intervals. However, this increase in EER can counteract increasing GHX temperature creep.

In summary, study results suggested that: (1) the as-designed GHX pump staging flow control, when executed in the ISM, produced a near-zero creep for each GHX, but the heat pump entering water temperature varied greatly over the annual run, suggesting a varying effect on the plant EER; (2) the ISM, when executed with all GHX pumps running at 100% duty for the entire year, produced a larger annual GHX creep with no appreciable change of heat pump entering water temperature; (3) maximum GHX EER occurred at minimum GHX pump flow in both heating and cooling modes, suggesting that a pump staging control that favored all pumps running at minimum flow prior to ramping individual pumps to maximum flow may have a positive effect on GHX EER maximization; (4) the ISM was executed through an annual run with a pump staging control and the total GHX power consumption was demonstrated to be 30% less than the baseline (as-designed) configuration; and (5) particle swarm optimization of GHX pump control schedules for minimum plant power consumption demonstrated a trade-off between GHX creep and plant EER.

In one embodiment, the energy saving algorithm can thus include individually controlling each GHX pump in a system. The algorithm can employ the use of a moving horizon, such that: (1) At initial start, the GHX pumps are controlled according to the hourly run schedule calculated from the PSO process. These initial (design) run schedules are arrays of 8760 points representing hourly run information for one year. (2) After one week of continuous run, the algorithm examines actual performance to date and uses this observed performance to predict system behavior for another year. This predicted behavior is then run as an input to the ISM and, running the PSO routine again, a new 8760 runtime schedule is generated for each GHX pump; and (3) This process is repeated for the duration of the equipment operation, so that once per week, the entire year-long simulation is conducted along with the PSO algorithm to re-optimize the GHX operating schedules. In this manner, weekly optimizations are performed continuously so as to account for system operation outside design parameters.

Thus, by tracking heat transfer, pumping energy, and entering water temperature to heating or cooling equipment, an overall plant efficiency, such as an EER, can be determined. System variables, such as flow rate, can then be changed automatically to determine if additional efficiency is possible. By measuring and analyzing actual outcomes, better control algorithms can be determined instead of solely being based on theoretical information. Some thermally massive heat storage systems, such as ground-source heat exchangers can provide additional thermal capacity at lower flow rates, which is counter-intuitive to standard engineering assumed performance.

Another exemplary energy saving strategy includes charging a building component, material or system with thermal energy (or cooling that material) in advance of energy need in order to time shift available energy or time shift the discharge of the thermal energy to improve the efficiency of the system. This process includes measuring the rate of thermal decay of a given material (e.g., the fabric of a building, ice, phase-change material or water storage, the mean earth temperature of a geothermal borefield, etc.) and then using that loss rate (i.e., the thermal decay rate) to determine a temperature decay rate for the material that can be projected in order to analyze the energy efficiency of storing, or discharging a given amount of energy at a given time under given conditions. An algorithm can then be used to determine how much thermal energy can be successfully stored or dissipated over a particular period of time in that material under the given conditions in order to determine how much energy can be effectively and efficiently added to the material (net of the thermal decay rate) in order to time shift that energy to when it may be more efficiently used or discharged into the environment.

Another exemplary energy saving strategy includes using multiple variables to determine the best method for an HVAC system or sub-systems to use to meet building energy demands over a given time period with the user defining the best outcome based on the selection of one, or more criteria. This may entail activating various thermal sources and sinks based upon actual thermal loads of the building, availability of the source or sink to address the load and the relative cost of the energy from the source or sink. For example, if 58° F. chilled water is needed for radiant cooling, it might be available from an air-cooled chiller (relatively high energy cost), closed-circuit evaporative cooling tower (lower energy cost), or directly from a ground-source earth heat exchanger (lowest energy cost).

Another exemplary energy saving strategy includes directly manipulating the temperature difference between the source of thermal energy and the use of that energy in order to increase the efficiency of the energy transfer (i.e. the $\Delta T$). The application of monitoring-based control algorithm optimization allows the software to automatically track energy transfer per unit of input energy, then optimize the flow rate, etc. to provide optimum heat transfer at lowest input energy consumption.

Other exemplary energy saving strategies include: (1) determining the optimal size of each component in a hybrid HVAC system for the highest return on investment, highest energy efficiency, or other factors; (2) determining the optimal setpoints; (3) automated fault detection and diagnostics; (4) optimal maintenance scheduling; (5) increased occupant awareness via performance feedback reports; and (6) determining the most efficient source of energy to use, when and for how long to achieve a target level of energy availability from a hybrid HVAC system that has multiple methods to provide the needed heating and cooling source thermal energy.

Additional details pertinent to the present invention, including materials and manufacturing techniques, may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are a plurality of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A method of implementing an optimized heating and cooling system, the method comprising:
    simulating energy use of a virtual heating and cooling system having an expected thermal load and operating a thermal source or sink to obtain an optimized virtual system design;
    developing controls for an actual heating and cooling system based upon the optimized virtual system design;
    exporting the controls to a controller for the actual heating and cooling system;
    operating the actual heating and cooling system according to the controls;
    tracking a thermal load on the actual heating and cooling system for a set period of time;
    determining whether an additional energy saving strategy would reduce energy use of the actual heating and cooling system by simulating energy use of a virtual heating and cooling system having the tracked thermal load and operating a thermal source or sink to obtain a second optimized virtual system design;
    if the additional energy saving strategy would reduce energy use of the actual heating and cooling system, developing modified controls for the actual heating and cooling system based upon the second optimized virtual system design; and
    operating the actual heating and cool system according to the modified controls.

2. The method of claim 1, wherein the energy saving strategy comprises separately controlling the pumping rates and times for a plurality of different heat sources or sinks individually.

3. The method of claim 1, wherein the energy saving strategy comprises charging a building component in advance of projected energy needs.

4. The method of claim 1, wherein the energy saving strategy comprises manipulating a temperature difference between a source of thermal energy and a user of energy.

5. The method of claim 1, further comprising obtaining the expected thermal load from an energy model.

6. The method of claim 1, wherein the controls include runtime and start time for a thermal source and sink.

* * * * *